Nov. 11, 1958  B. WOODWARD, JR., ET AL  2,859,784
POTATO SLICING MACHINE

Filed Oct. 23, 1956  2 Sheets-Sheet 1

INVENTOR.
BERNARD WOODWARD, JR.
WINSLOW E. THOMSON
BY

ATTORNEY

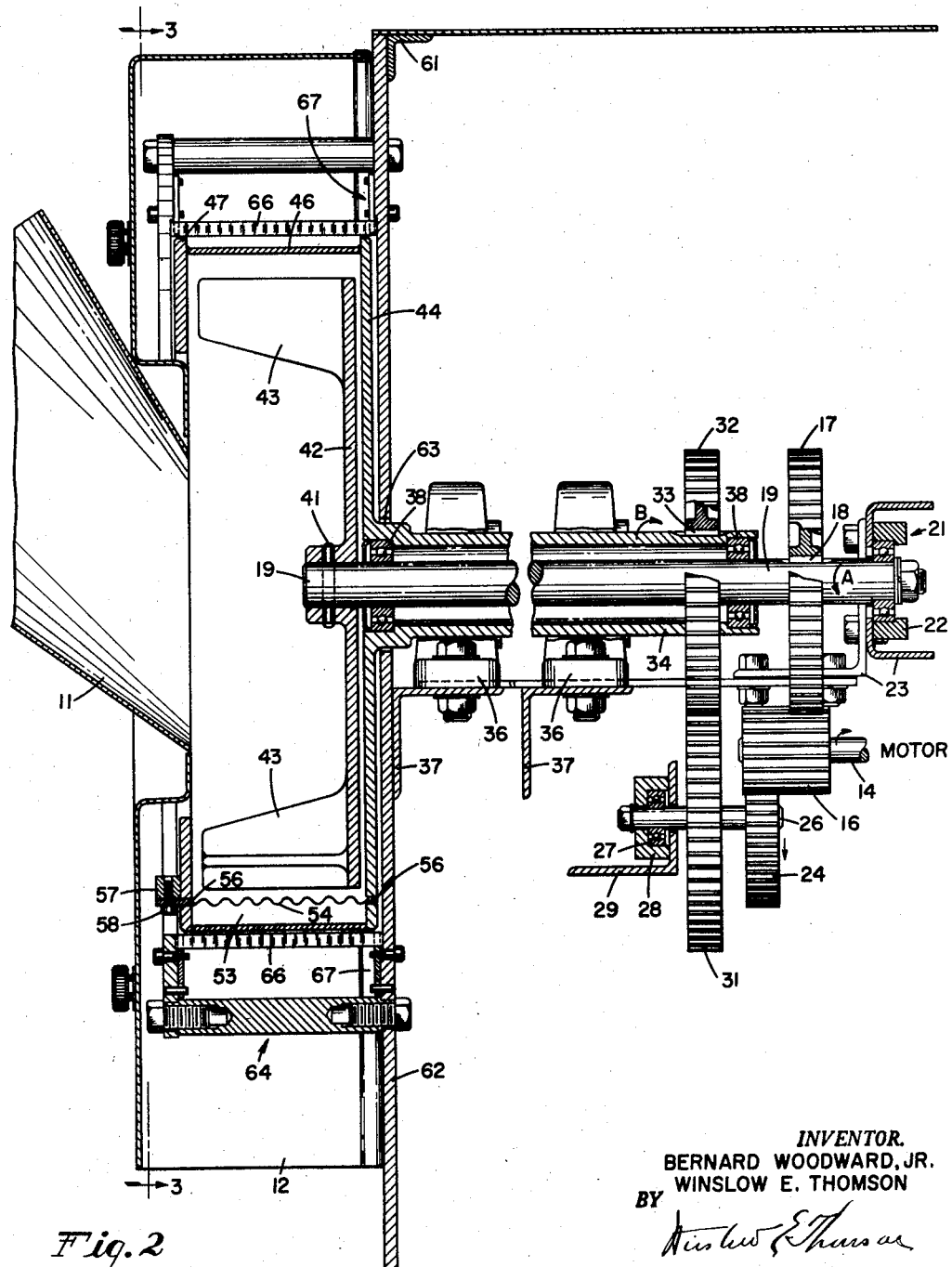

United States Patent Office 2,859,784
Patented Nov. 11, 1958

2,859,784

POTATO SLICING MACHINE

Bernard Woodward, Jr., Rochester, and Winslow E. Thomson, Pittsford, N. Y., assignors to F. B. Pease Company, Rochester, N. Y., a corporation of New York Application October 23, 1956, Serial No. 617,842

5 Claims. (Cl. 146—78)

This invention relates to a potato slicing machine and more particularly to a machine for producing crinkled potatoes for French frying. Reference is made to Patent No. 2,832,387, dated April 29, 1958, issued to Bernard Woodward, Jr.

An object of the invention is to provide a machine inexpensive to manufacture and efficient in operation adapted to produce from peeled whole potatoes, sliced potatoes for French frying.

Another object of this invention is to provide a machine for cutting whole peeled potatoes into crinkled sliced potatoes suitable for French frying, the machine being inexpensive to manufacture, efficient in operation and adapted to produce crinkled sliced potatoes in large quantities.

Our invention further contemplates a machine having a casing into which whole peeled potatoes are discharged, the casing having potato propelling means mounted therein and having a discharge gap carrying a knife blade which cuts the potatoes into slabs and discharges them through the gap as the casing and the propelling means are rotated in opposite directions, the slabs of potatoes being forced through the casing gap into a position adjacent an annular stationary ring of radially extending knives and the external walls of the casing being configurated in such manner that as it rotates the slabs are forced between the knives and cut into frying size pieces.

Other objects and advantages of our invention will be particularly set forth in the claims and will be apparent from the following description, when taken in connection with the accompanying drawings, in which:

Fig. 2 is an enlarged vertical sectional view of the machine;

Figure 1:
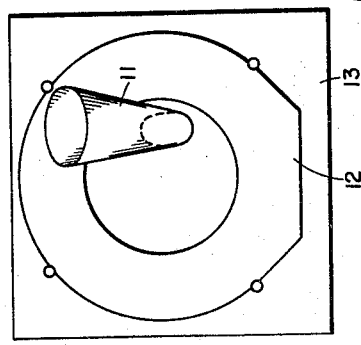
Fig. 1 is a front elevation of the machine of our invention.

Referring to Figs. 1 and 2, the machine of our invention comprises a whole sliced potato intake chute 11; a sliced potato discharge chute 12; a frame generally indicated by the numeral 13 which carries the mechanism to be described; a drive shaft 14 driven by a motor (not shown) carried by the frame; and suitable mechanism presently to be described for first cutting the potatoes into slabs and then slicing the slabs into frying size pieces.

The frame, as appears in Fig. 1, is generally rectangular in shape and may include legs (not shown) for supporting the frame 13 at the proper height in a potato peeling, slicing and packing line. The frame may be made up of suitable angle irons or other structural shapes suitably welded or otherwise secured together to form a strong structural support for the operating mechanism.

The motor driven shaft 14 which is supported in the frame in any suitable manner drives a pinion 16 secured to the motor driven shaft 14 which drives a gear 17 keyed, as indicated at 18, to a shaft 19. The shaft 19 is supported by a bearing assembly, generally indicated by the numeral 21, carried at least partly by a bearing support 22 rigidly secured to structural frame members 23 as by welding, the structural frame member 23 being fixed to the machine frame 13 in any suitable manner (not shown). The pinion 16 also drives a gear 24 rigidly secured to a shaft 26. The shaft is rotatable in bearings 27 carried in a bearing block 28 supported by a structural member 29 of the main frame. Rigidly secured to the shaft 26 and driven thereby is a gear 31 which meshes with a gear 32 fixed, as indicated at 33, to a hollow drive shaft or drive sleeve 34.

The drive shaft or drive sleeve 34 is mounted in suitable bearings 36 carried by angle irons 37 tied to the main frame 13. Mounted internally of the hollow shaft or sleeve 34 are bearings 38 which support the shaft 19 in concentric relation to the drive shaft or sleeve 34, that is, the two drive shafts are on a common axis of rotation. It will be appreciated from the foregoing that, and as indicated by the arrows A and B, the shaft 19 and the shaft or sleeve 34 are driven in opposite directions.

Secured to the shaft 19 by means of a pin 41 is a plate 42 which carries a plurality, in this case four, paddles or potato propelling elements 43. The potato propelling elements preferably are arranged on the plate in a sidewardly extending direction normal to the surface thereof. As the potato propelling elements 43 are rotated, they exert a propelling force on the peeled potatoes and, in addition, centrifugal force is applied on the potatoes whereby the potatoes are urged in a circulatory direction and also tend to be thrown outwardly with respect to the potato propelling means.

While the parts may be formed separately and secured together, preferably the shaft or sleeve 34 is formed integrally with a plate 44. Welded or otherwise secured to the plate 44 is a peripheral wall 46 into engagement with which the potatoes are urged by the centrifugal forces generated by the potato propelling means 43. The peripheral wall 46 has welded or otherwise secured thereto an annulus 47. The plate 44, the peripheral wall 46 and the annulus 47 define a casing into which the potatoes are discharged through the discharge chute 11.

Figure 3:
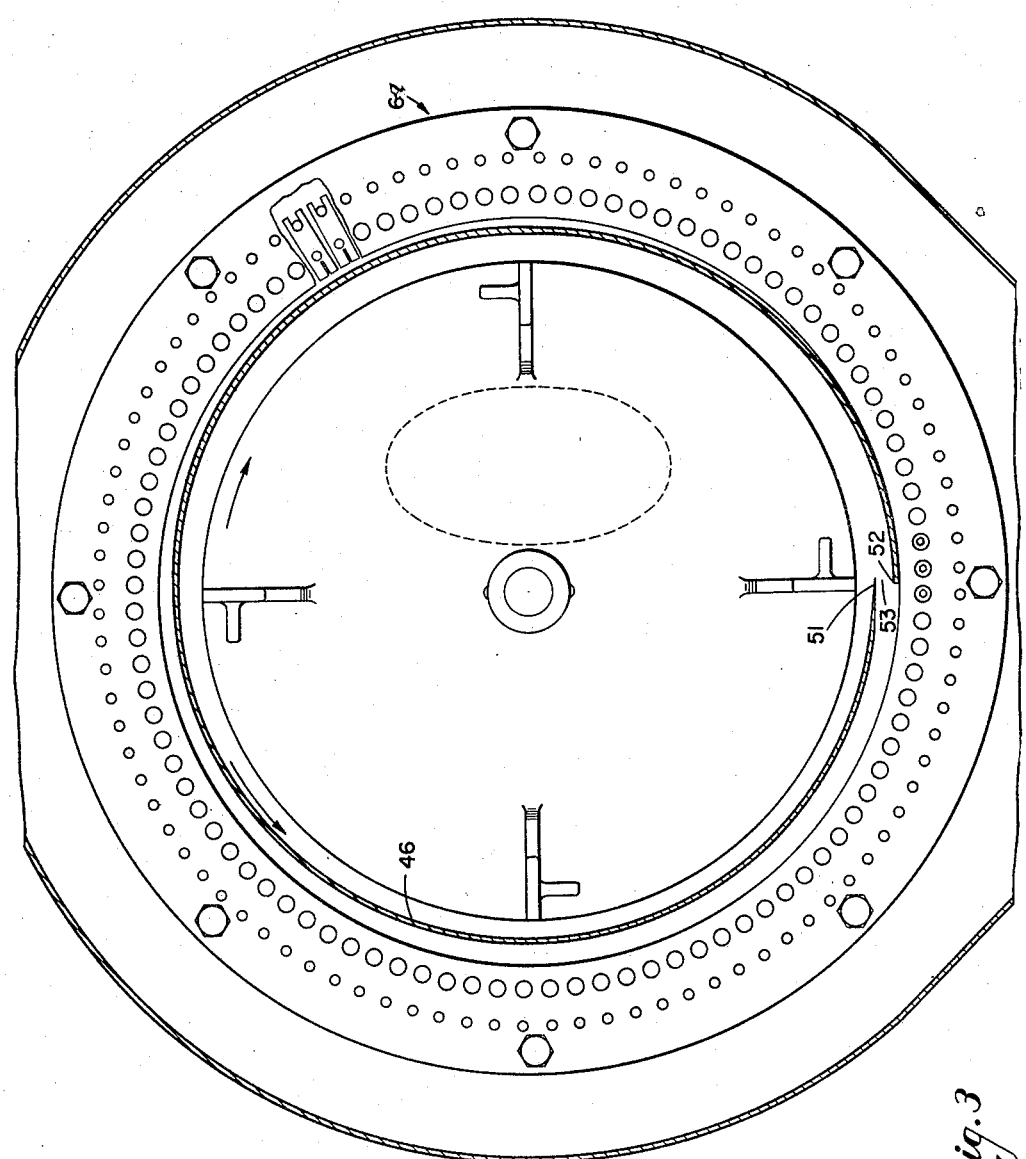
Fig. 3 is a sectional view taken substantially on the line 3—3 of Fig. 2 in the direction indicated by the arrows.

Referring now to Fig. 3 the peripheral wall 46 is spiral in shape, the wall increasing in distance from the axis of rotation from a starting point 51 around the axis of rotation in a clockwise direction to an ending point 52. There is thus provided a gap 53 between the starting point 51 and the ending point 52.

Mounted on the peripheral wall 46 at what may be considered the starting point 51, is a knife 54 (Fig. 2). The knife 54 may be provided with a straight cutting edge to produce conventional pieces of potatoes for French frying. However, preferably the knife is fluted, as shown, to produce what may be termed "crinkled" potato slabs which slabs are later cut, as will presently appear to produce "crinkled" frying size pieces of potatoes. The flutes of the knife 54 taper toward the forward edge to form a thin sharpened cutting edge. In an end or sectional view (Fig. 2), the slab cutting knife 54 resembles a sine wave.

The edges of the slab knife 54, cutting as indicated at 56, are unsharpened and fitted into annular slots formed in the plate 44 and the annulus or shroud 47. The annulus carries a knife mounting fixture 57 to which the knife is secured as by screws 58.

As shown (Fig. 2), an angle iron or angle irons 61 are provided which are tied to the frame of the machine and support a stationary plate or wall 62. The shafts 19 and 34 extend through an opening 63 in the stationary plate 62. The stationary plate constitutes part of a carrying assembly, generally indicated by the numeral 64. Supported by the knife carrying assembly 64 is a plurality of knives 66. These knives are arranged in fixed spaced relation to each other and their cutting edges are equidistant from the axis of rotation of shafts 19 and 34.

Means are provided as generally indicated at 67 for placing the knives 66 under tension. The knives may be either straight or fluted and are stationary, that is, they are carried by the rigid stationary plate 62.

It will now be understood that the whole peeled potatoes, more or less continuously fed into the stationary casing through the intake chute 11, are picked up and rotated by the paddles or potato propelling elements 43 and pressed by centrifugal force against the internal surface of the peripheral wall 46. Due to the fact that the peripheral wall 46 and the potato propelling means 43 are driven in opposite directions, the potatoes are sliced into slabs. These slabs are discharged through the gap 53 into a position directed against the cutting edges of the stationary radially extending knives 66.

As the peripheral wall 46 rotates in a counterclockwise direction, as viewed in Fig. 3, the external face of the spirally extending wall presses the slabs into cutting relation with the radial knives and the slabs are completely cut into frying size pieces. When any particular slab is cut by the radial knives, the pieces lie between the knives in cut condition and are discharged from between the knives when a succeeding slab is cut after the peripheral wall 46 has made a complete rotation. That is, the next slab cut by the slab cutting knife 54 is projected through the gap 53 and as this slab is forced into engagement with the radial knives by the spiral wall, the pieces of the slab cut on the previous rotation are forced outward between the knives and drop into the discharge chute 12.

For the purpose of simplification of the machine, we have shown a fixed discharge gap 53. However, it will be appreciated that the gap 53 could be adjustable to vary the thickness of the slabs cut.

While we have shown and described the preferred form of mechanism of our invention, it will be apparent that various changes and modifications may be made therein, particularly in the form and relation of parts, without departing from the spirit of our invention as set forth in the appended claims.

We claim:

1. A machine for slicing potatoes comprising, in combination, a rotatable casing into which whole peeled potatoes are discharged, said casing having a wall against which the potatoes are propelled, the potatoes being held in engagement with the wall by centrifugal force, means for propelling said potatoes, means for rotating said propelling means about an axis of rotation, said wall having a gap through which sliced slabs of potatoes may be discharged from the casing, a knife for slicing said potatoes fixed to said wall, a multiplicity of stationary knives arranged around the exterior of said wall in essentially radial relation to said axis of rotation, means for rotating said wall about said axis of rotation in a direction opposite to the direction of rotation of said propelling means, means for projecting the cut slabs against said radial knives to slice the slabs into frying size pieces and means for discharging the slices outwardly of said axis of rotation between said knives, said radial knives extending substantially completely around the outer periphery of said rotating wall whereby the slabs of potatoes are being substantially continuously sliced as said wall and said propelling means are rotated in opposite directions.

2. A machine in accordance with claim 1 wherein the exterior of said wall is eccentric with respect to said axis of rotation and constitutes the projecting means and the radial knives are of thin spring steel and are tensioned so that should they be distorted as the slabs are cut they will spring back to the substantially radial position.

3. A machine in accordance with claim 1 in which the slab cutting knife and the multiplicity of radial knives are both corrugated.

4. A machine in accordance with claim 1 wherein said wall is a spiral whereby the stationary cutting edges of said knives as the wall is rotated are in constantly changing spaced relation to said wall.

5. A machine in accordance with claim 1 in which the propelling means is arranged on the rotor so that the potatoes may have access to substantially the entire periphery of said rotating wall at all times whereby potatoes are substantially continuously presented to said cutting means, the outer periphery of said wall being a spiral whereby the stationary cutting edges of said knives as the wall is rotated are in constantly changing spaced relation to said wall.

References Cited in the file of this patent

UNITED STATES PATENTS

| 2,187,957 | Urschel | Jan. 23, 1940 |
| 2,664,130 | Kubon | Dec. 29, 1953 |

FOREIGN PATENTS

| 430,266 | Great Britain | June 17, 1935 |